United States Patent [19]

Rieper et al.

[11] Patent Number: 5,066,687

[45] Date of Patent: Nov. 19, 1991

[54] POWDERED AZO PIGMENTS WITH IMPROVED RHEOLOGICAL PROPERTIES, PROCESS FOR THEIR PREPARATION AND THEIR USE

[75] Inventors: Wolfgang Rieper, Frankfurt am Main; Otmar Hafner, Glashütten/Taunus, both of Fed. Rep. of Germany

[73] Assignee: Hoechst Aktiengesellschaft, Frankfurt am Main, Fed. Rep. of Germany

[21] Appl. No.: 526,692

[22] Filed: May 2, 1990

Related U.S. Application Data

[63] Continuation of Ser. No. 380,727, Jul. 13, 1989, abandoned, which is a continuation of Ser. No. 154,456, Feb. 8, 1988, abandoned, which is a continuation of Ser. No. 902,458, Aug. 11, 1986, abandoned.

[30] Foreign Application Priority Data

| Dec. 18, 1984 | [DE] | Fed. Rep. of Germany | 3446088 |
| Dec. 18, 1984 | [DE] | Fed. Rep. of Germany | 3448044 |
| Dec. 12, 1985 | [EP] | European Pat. off..PCT/EP85/00699 | |

[51] Int. Cl.$^5$ .................. C08K 9/04; B32B 5/16
[52] U.S. Cl. .................. 523/205; 428/407; 524/190; 427/213.3; 427/213.36
[58] Field of Search .............. 428/407; 523/205; 524/190; 427/213.3, 213.36

[56] References Cited

U.S. PATENT DOCUMENTS

| 4,029,861 | 6/1977 | Jones | 528/84 |
| 4,032,698 | 6/1977 | Ashe | 528/73 |
| 4,048,207 | 9/1977 | Jones | 526/128 |
| 4,070,388 | 1/1978 | Jones | 560/158 |
| 4,386,195 | 5/1983 | Bremer et al. | 528/73 |
| 4,647,647 | 3/1987 | Haubennestel et al. | 528/62 |

FOREIGN PATENT DOCUMENTS

| 2436204 | 2/1975 | Fed. Rep. of Germany | 523/205 |
| 15719 | 2/1974 | Japan | 523/205 |

*Primary Examiner*—John C. Bleutge
*Assistant Examiner*—Helen F. Lee
*Attorney, Agent, or Firm*—Connolly & Hutz

[57] ABSTRACT

Powdered azo pigments with improved rheological properties for use in paint systems on an alkyd/melamine, acrylic/melamine, acrylate/isocyanate or polyester/isocyanate basis, both of a conventional nature and also of a modern nature of the "high solids" type, to which—as appropriate before, during or after finishing—1 to 20% by weight of the active substance of a paint additive of the polyurethane series, prepared by reacting polyisocyanurates which still carry free isocyanate groups and are based on toluylene diisocyanate, hexamethylene diisocyanate or mixtures thereof, with (1) aliphatic mono- or polyhydroxycarbonylic acid $C_1$-$C_{20}$-alkyl esters (degree of polycondensation 2-50), (2) polyethylene glycols (molecular weight 500-1,500) and (3) 5- or 6-membered, saturated or unsaturated heterocyclic compounds which contain at least one nitrogen atom in the ring and reactive amino or hydroxy-$C_1$-$C_6$-alkyl groups, until isocyanate groups are no longer detectable, has/have been applied, a process for their preparation and their use for pigmenting paint systems.

12 Claims, No Drawings

POWDERED AZO PIGMENTS WITH IMPROVED RHEOLOGICAL PROPERTIES, PROCESS FOR THEIR PREPARATION AND THEIR USE

This application is a continuation of U.S. application Ser. No. 07/380,727 filed July 13, 1989, now abandoned, which is continuation of U.S. application Ser. No. 07/154,456 filed Feb. 8, 1988, now abandoned which is a continuation of U.S. application Ser. No. 902,458 filed Aug. 11, 1986 for "Powdered Azo Pigments with Improved Rheological Properties, Process for thier Preparation and Thier Use", by Wolfgang Rieper and Otman Hafner, now abandoned.

The invention relates to powdered azo pigments which are coated with 1-20% by weight of the active substance of an additive of the polyurethane series and have improved rheological properties for use in conventional and modern paint systems of the "high solids" type, and to a process for their preparation.

BACKGROUND OF THE INVENTION

When organic pigments are dispersed in paint systems, the aim must be to achieve optimum stabilization of the pigment particles with the binders of the paint system. In addition to the chemical structure and the physical nature of the pigments, the dispersion method and, in particular, the type of binder and amount of solvent in the paint system is decisive for the degree of this stabilization. Inadequate stabilization leads to gloss, viscosity and flocculation problems, alongside deterioration of the coloristic pattern. A number of measures are known for improving these properties of the pigments, and these all lead to a clear reduction in the problems in conventional paint systems.

DESCRIPTION OF RELATED ART

The following may be mentioned as examples of these:

The preparation of pigments with surface-active substances, for example resin soaps, alkylphenol polyglycol ether-sulfonates (German Patent 2,152,485) or quaternary ammonium compounds (German Offenlegungsschrift 3,338,806). Additives which are added during paint conditioning to prevent flocculation of the pigments in the paint and to improve the rheological properties are also known, such as, for instance, higher-molecular urea derivatives (German Auslegeschrift 2,906,111).

Recent developments in the paint field with the aim of drastic reduction in the amount of solvent and a marked reduction in the size of the binder molecules, such as, for example, in the direction of "TSA-NAD" (thermosetting acrylic non-aqueous dispersion) and "high solids" (paint systems with a binder content of more than 50% during application), have led to considerable difficulties in achieving perfect stabilization of the pigments in these paint systems. For this reason, special additives have been developed which either 1. are intended to solve the problem by mutual mechanical dispersion with the pigments in solvents and subsequent combination with the paint, or 2. are added to the paint/pigment mixture before mechanical dispersion.

The first route is described, for example, in U.S. Pat. Nos. 4,029,861, 4,032,698, 4,048,207 and 4,070,388. Here, the pigment is subjected to predispersion in the paint solvent with the polymeric active substances, which are dissolved in organic solvents, up to 50% of active substance, based on the pigment employed, being used. The pigment dispersion thus obtained is then added to the paint binder system for pigmenting.

The polymeric materials described and used for dispersion are prepared by linking polymeric structural units of the paint with organic compounds carrying acid, basic or silane end groups via at least bifunctional isocyanates of the aliphatic and aromatic series. Linking can be effected either via urethane or via urea groupings.

Suitable auxiliaries, which are added afterwards to the pigmented paints, are also known for the second abovementioned route for stabilizing a pigment/paint dispersion.

In European Published Application 0,154,678, addition compounds are proposed as dispersants, which are obtained by the following reaction sequence:

Reaction of polyisocyanates having a mean functionality of 2.5 to 6 with monohydroxy compounds, reaction of the resulting reaction product with compounds of the formula

wherein E is —OH, —NH$_2$ and/or —NHR (R representing an alkyl group having 1 to 4 carbon atoms) and n is 2 or 3, and G is an aliphatic, cycloaliphatic and/or aromatic group, and further reaction of the reaction product thus obtained with compounds of the formula

wherein Q is —OH, —NH$_2$, —NHR (R representing an alkyl group having 1 to 4 carbon atoms) or —SH and Z is a group which contains at least one nitrogen-containing basic group.

However, the improvement, described in the literature references quoted above, of the dispersion behavior of pigments does not by any means apply to all pigments. In particular, in spite of the broad quotation of inorganic and organic pigments (anthraquinone, phthalocyanin, quinacridone and other pigments), there is no case of an azo pigment being listed as an example.

The lack of a universal procedure proves to be a further disadvantage of the known methods mentioned, that is to say the nature and quantity of the additive must be determined empirically for the particular pigment and binder system. Moreover, the high proportion of additives (up to 20% in the case of paint conditioning) recommended, for instance, for commercially available paint additives, involves the disadvantage of a necessary increase of the solvent proportion in the paint system. This is exactly contrary to the aim of reducing the solvent quantity in the paint. In addition, incompatibilities with already surface-treated pigments have been observed in paint manufacture in combination with the additives described.

There was thus a demand for the development of powdered pigments of a quality, wherein further additives are no longer required for obtaining optimum rheological properties in paint conditioning, above all also in modern paint systems such as "TSA-NAD" and "high solids".

SUMMARY OF THE INVENTION

The present invention relates to a powdered and coated azo pigment with improved rheological properties for use in a paint system on an alkyd/melamine, acrylic/melamine, acrylate/isocyanate or polyester-/isocyanate basis both of a conventional nature and of a modern nature of the "high solids" type, to which—as appropriate before, during or after finishing—1 to 20% by weight of the active substance of a paint additive of the polyurethane series, prepared by reacting polyisocyanurates which still carry free isocyanate groups and are based on toluylene diisocyanate, hexamethylenediisocyanate or mixtures thereof, with (1) aliphatic mono- or polyhydroxycarboxylic acid $C_1$-$C_{20}$-alkyl esters (degree of polycondensation 2-50), (2) polyethylene glycols (molecular weight 500-1,500) and (3) 5- or 6-membered, saturated or unsaturated heterocyclic compounds which contain at least one nitrogen atom in the ring and contain reactive amino or hydroxy-$C_1$-$C_6$-alkyl groups, until isocyanate groups are no longer detectable, has/have been applied. The present invention relates furthermore to a process for the preparation of the afore-said powdered and coated azo pigment which comprises treating the base pigment—as appropriate before, during or after finishing—with 1 to 20% by weight of the active substance of a paint additive of the polyurethane series prepared by reacting polyisocyanates base don toluylene diisocyanate, hexamethylene diisocyanate or mixtures thereof with (1) aliphatic mono- or polyhydrocarboxylic acid $C_1$-$C_{20}$-alkyl esters (degree of polycondensation 2-50), (2) polyethylene glycols (molecular weight 500-1,500) and (3) 5- or 6-membered, saturated or unsaturated heterocyclic compounds which contain at least 1 nitrogen atom in the ring and still carry reactive amino or hydroxy-$C_1$-$C_6$-alkyl groups, until isocyanate groups are no longer detectable.

The treatment is carried out in an inert solvent, for example in hydrocarbons, ethers, esters, ketones or acid amides.

The said 5- or 6-membered, saturated or unsaturated heterocyclic compounds employed in the preparation of the aforesaid powdered azo-pigments, which in most cases have one nitrogen atom in the ring system and carry a group which can react with isocyanates can be summarized by the general formula $$H-R_1-R_2-R_3 \qquad (I)$$

in which $R_1$ represents —O— or —NH—, $R_2$ represents an alkylene group with 1-6 carbon atoms and $R_3$ represents a 5- or 6-membered, saturated or unsaturated heterocyclic ring system containing nitrogen atoms.

Examples of compounds of the afore-said formula (I) are 1-(2-hydroxyethyl)-pyrrolidine, 2-(1-pyrrolidyl)-ethyl-amine, 1-(2-hydroxyethyl)-piperidine, 2-(1-piperidyl)-ethylamine, 1-(2-aminopropyl)-piperidine, 4-(2-hydroxyethyl)-morpholine, 2-(4-morphyolinyl)-ethylamine (sic), 4-(3-aminopropyl)-morpholine, 1-(2-hydroxyethyl)-piperazine, 1-(2-aminoethyl)-piperazine, 1-(2-hydroxyethyl)-2-alkylimidazolines, 1-(3-aminopropyl)-imidazole, 1-(3-hydroxypropyl)-imidazole, (2-aminoethyl)-pyridine, (2-hydroxyethyl)-pyridine, (3-hydroxypropyl)-pyridine, (2-hydroxymethyl)pyridine and N-methyl-2-hydroxymethylpiperidine.

It was not to be expected that the result of the invention can be achieved in the absence of paint binders without using mechanical shearing forces, as in the case of addition of the additive to the paint, but this does not exclude exposure of the pigment suspension to shearing forces during preparing—as appropriate before, during or after finishing.

It was furthermore not to be expected that it is possible to achieve the same maximum effect on application of the urethane resin in the pigment suspension—as appropriate before, during or after finishing—since resin portions which are not fixed onto the pigment surface are present, on drying of the pigment powder, as coarser portions which are known to dissolve only with great difficulty during conditioning of the paint and would interfere with the desired effect, as in fact occurs with purely mechanical mixtures. In addition, it was not to be expected that the amount of the additive can be drastically reduced in comparison with use during conditioning of the paint and the optimum effect can be achieved by appropriate application of the additive to the surface of the pigment, in the suspension, which is brought into the optimum state of division during preparation.

Above all, it was surprising that azo pigments are also suitable for coating with the active substance of the additives described. As already mentioned, inorganic pigments, pigments of the anthraquinone, phthalocyanine and quinacrione (sic) series and other chemical classes are described in the abovementioned known methods for stabilizing pigment/paint dispersions or for improving the rheological properties (German Patent 2,152,485, German Auslegeschrift 2,906,111, German Offenlegungsschrift 3,338,806, U.S. Pat. Nos. 4,029,861, 4,032,698, 4,048,207, 4,070,388, European Published Application 0,154,678), but in no case is the treatment of an azo pigment mentioned.

By contrast, in the processes known from the literature for improving the rheological properties of azo pigments in paint dispersions, the effect is achieved by a controlled variation of the physical parameters, such as enlargement of the pigment particle size and variation of the particle size distribution (for example German Patent 2,302,482 and German Auslegeschrift 2,302,509); however, this entails a pronounced change in the coloristic properties, above all a decrease in tinctorial strength.

DESCRIPTION OF THE PREFERRED EMBODIMENTS

The paint additive can be applied to the azo pigment surface in various ways: by addition to the aqueous pigment suspension, to the pigment suspension in a water/solvent mixture or to the pigment suspension in organic solvents—as appropriate before, during or after pigment finishing.

The addition of the additive to the aqueous pigment suspension can be carried out in those solvents which are at least partially water-miscible, such as aliphatic alcohols of 1 to 3 carbon atoms, such as, for example, ethanol or propanol; glycols, glycol ethers and glycol esters, such as, for example, ethylene glycol, diethylene glycol, propylene glycol, glycol mono-$C_1$-$C_6$-alkyl (sic) ethers, diglycol mono-$C_1$-$C_4$-alkyl ethers, diglycol dimethyl ethers, ethylglycol acetate, methylglycol acetate and butyldiglycol acetate; ketones of the general formula $$\text{alkyl-}C_1-C_4-\underset{\underset{O}{\|}}{C}-\text{alkyl-}C_1-C_4,$$

such as, for example, acetone, methyl ethyl ketone, methyl isobutyl ketone or diacetone alcohol (4-methyl-4-hydroxy-pentan-2-one); aliphatic carboxylic acids with 1-4 carbon atoms, such as, for example, formic acid, acetic acid or propionic acid, aliphatic carboxylic acid amides with 1-5 carbon atoms, such as, for example, dimethylformamide; and cyclic carboxylic acid amides, such as, for example, N-methylpyrrolidone.

In conjunction with solvent finishing of an azo pigment say a thermal aftertreatment of the pigment in order to increase the hiding power or to improve the technological properties—the additive is advantageously added in the solvent in which the thermal aftertreatment of the pigment is carried out.

Particularly suitable solvents have here proved to be those which are insoluble or not infinitely soluble in water, such as aromatic hydrocarbons, for example toluene or xylenes; halogenated aromatics, for example chlorobenzene or o-dichlorobenzene; nitroaromatics, for example nitrobenzene; higher alcohols with 4-6 carbon atoms, such as, for example, isobutanol, or esters of aromatic acids, for example methyl or ethyl benzoate, and aromatic ethers, such as anisole or phenetole.

The additive or its solution in one of the said solvents can here be added before or after finishing. By a following steam distillation, the solvent used can be driven off rapidly and quantitatively from the suspension and the additive can be applied to the surface of the pigment in a particularly simple manner and with high efficiency. The azo pigment thus prepared can be isolated in the conventional manner from the remaining aqueous suspension.

The application of the active substance in one of the solvents mentioned can also be effected without prior or subsequent thermal treatment (finishing) of the pigment, by a procedure in which the solvent used is distilled off again, for example with steam, immediately after addition of the additive solution to the aqueous pigment suspension with intensive stirring.

Frequently the additive is not available in one of the solvents mentioned, that is to say the active substance of the additive—as a result of the synthesis of the latter—is present in another solvent or in a solvent mixture. The following methods can be used for converting the active substance into a form suitable for the preparation of the particular azo pigment:

1. Precipitation of the active substance from the additive solution, for example by addition of aliphatic hydrocarbons, for example hexane, separating it off by filtration, if appropriate drying it at relatively low temperatures and dissolving the isolated active substance in one of the desired solvents.

2. Distilling off the additive solvent in vacuo and taking up the remaining active substance in a solvent suitable for preparing the pigment.

3. Addition of a higher-boiling solvent to the additive solution and subsequently distilling off the lower-boiling solvent in which the active substance has been dissolved, if appropriate under a reduced pressure and/or with the addition of water to form a lower-boiling azeotrope. Above all, aliphatic carboxylic acids, glycols and glycol acetates have proved advantageous as higher-boiling solvents suitable for preparing the pigment.

The use of organic carboxylic acids is advisable particularly in cases where the additive is of weakly basic character. In these cases, it can then be advantageous to neutralize the organic acid after the preparation or to make the pigment suspension weakly alkaline. Additives of weakly basic character can also be used in dilute aqueous, weakly acetic solutions, preferably solutions containing acetic acid.

If the additive is of basic character, it may furthermore be of advantage to neutralize it with equivalent amounts of anionic auxiliaries, such as, for example, alkylphenol polyglycol ether-sulfates, resin soaps or sulfosuccinic acid esters.

The addition of these auxiliaries can in each case be carried out before, during or after finishing. However, it is not necessary to add the additive and auxiliary in the same stage of pigment finishing.

The powdered azo pigments prepared according to the invention exhibit excellent rheological properties in all paint systems, particularly in the systems which are usually difficult to pigment, such as "TSA-NAD" and "high solids". Compared with the untreated comparison pigments, they are distinguished in the corresponding paint systems by markedly improved gloss, viscosity and flocculation properties, and frequently also by a higher tinctorial strength.

The process according to the invention for the preparation of the powdered azo pigments having improved rheological properties is illustrated in more detail by the following examples. The parts and percentages mentioned there relate to the weight.

EXAMPLES 1 (sic)

31.5 parts of a 50% solution of a polyisocyanurate with the idealized structure of the following formula

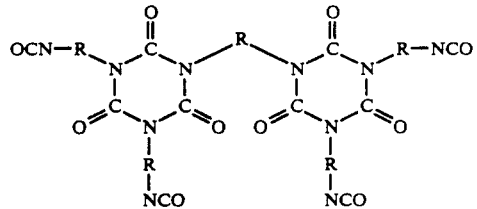

in which R is the toluylene radical, 31.5 parts of ethylglycol acetate and 0.04 part of dibutyltin dilaurate are taken in a stirred vessel and warmed to 50° C. 19.1 parts of a polyester of 1 mole of decanol and 7 moles of ε-caprolactone, dissolved in 19.1 parts of ethylbenzene, are added rapidly and the mixture is stirred at 80° C. for 1 hour. The NCO content is thereby reduced from 2.4% at the start of the first part reaction to 1.6%.

8 parts of a polyethylene glycol (average molecular weight 1,000) and 3.75 parts of N-(3-aminopropyl)-imidazole are dissolved in 73.5 parts of xylene at 50° C. in a second reaction vessel. The reaction product from the first reaction stage is added dropwise in the course of 30 minutes and the batch is stirred at 80° C. for a further 2 hours. An almost clear, colorless, low-viscosity product with a solids content of 25%, the IR spectrum of which no longer shows an NCO band, is obtained. Average molecular weight of the solid: 6,300.

EXAMPLE 2

100 parts of a 34.5% aqueous press-cake of C.I. Pigment Red 188 (12467) are stirred in 315 parts of demineralized water, and 160 parts of chlorobenzene, in which 7 parts of the additive obtained according to Example 1 had been dissolved, are added to the pigment suspension thereby obtained. The suspension is heated to 90° C., with intensive stirring, and kept at this temperature for 1 hour. The organic solvent is then distilled off by passing in steam and the pigment is filtered off from the aqueous suspension which remains. After drying at 60°–70° C. and grinding, 35.3 parts of prepared pigment powder are obtained. The full shade paint coatings produced with this powder are distinguished by very good rheological properties and outstanding gloss.

If, for comparison, the treatment described for the C.I. Pigment Red 188 in the chlorobenzene/water mixture is repeated without addition of the additive, 34 parts of the azo pigment are obtained, the full shade paint coatings of which show a marked gloss fog.

To compare the gloss values, the full shade cast films, baked in an oven, of 7% "TSA-NAD" (sic) paints prepared under the same conditions and, before casting, adjusted to a viscosity of 20 seconds (measured in a 4 mm diameter Ford cup) with paint solvents, were measured with a Hunterlab D48D gloss-measuring apparatus under an angle of 20°, the following gloss values being read off:

for the prepared azo pigment: 88
for the comparison pigment: 36.

EXAMPLE 3

100 parts of C.I. Pigment Red 188 (12 467) are heated to 90° C. in the form of a 34.5% press-cake in a mixture of 315 parts of water and 160 parts of chlorobenzene for 1 hour, with stirring. Thereafter, 100 parts of a 2% (based on active substance) aqueous, weakly acetic acid solution of the additive are added, which solution had been obtained by the following procedure: by adding a 1.5- to 2-fold quantity of n-hexane to the additive prepared according to Example 1, the active substance of the latter was precipitated. 2 parts of the isolated urethane resin were dissolved in 10 parts of acetic acid, and the solution was diluted with water to 100 parts.

The organic solvent is then distilled off from the pigment suspension, to which the additive solution has been added, by passing in a stream of steam. After filtration of the aqueous suspension with suction and drying of the moist press-cake, 35.8 parts of the prepared azo pigment are obtained, the full shade paint coatings of which in turn exhibit a high gloss effect.

Gloss value: 82.5.

EXAMPLE 4

14 parts of the additive obtained according to Example 1 are freed from volatile fractions under reduced pressure. The remaining resin is dissolved at about 75° C. in 115 parts of isobutanol. The isobutanol solution of the active substance of the additive is then mixed, with stirring at 75°–80° C., with a suspension of 36 parts of the coupling product of diazotized o-trifluoromethylaniline with 5-acetylaminobenzimidazolone (CAS No. 68134-22-5) in 450 parts of water. The pigment suspension is heated with stirring to 88° C. and held for 1 hour at this temperature, and the organic solvent is then distilled off by passing in steam. After the pigment has been filtered off from the aqueous suspension, dried at 60°–70° C. and ground, 38.4 parts of prepared powdered azo pigment are obtained.

In contrast to the comparison pigment, treated in an analogous manner but without the addition of additive, the prepared pigment powder shows excellent gloss in full shade (7% TSA-NAD paint), corresponding to pronounced differences in the values measured in the gloss measurement described in Example 2:

prepared azo pigment: 82
comparison pigment: 20.

We claim:

1. A powdered azo pigment with improved rheological properties for use in paint system on an alkyd/melamine, acrylic/melamine, acrylate/isocyanate or polyester/isocyanate basis both of the conventional nature and of a modern nature of the "high solids type", comprising coated azo pigment, the surface of the base azo pigment having been coated with 1 to 20% by weight of an active substance consisting of a paint additive of the polyurethane series, said paint additive prepared by reacting polyisocyanurates which carry free isocyanate groups, said groups being provided by toluylene diisocyanates, hexamethylene diisocyanate or mixtures thereof with each of the following reactants (1) aliphatic mono- or polyhydroxycarboxylic acid $C_1$–$C_{20}$-alkyl esters (degree of polycondensation 2–50) (2) polyethylene glycols having average molecular weight of 500–1500 and (3) 5- or 6-membered, saturated or unsaturated heterocyclic compounds which contain at least one nitrogen atom in the ring and contain reactive amino or hydroxy-$C_1$–$C_6$-alkyl groups, in such a quantity that the reactants react with said free isocyanate groups until isocyanate groups are no longer detectable, the azo pigment is coated by mixing in the form of a dispersion of the base azo pigment in water or in an organic solvent or in a mixture of water and an organic solvent, while stirring, with a solution of the said active substance in an organic solvent which is insoluble or not infinitely soluble in water, or in an organic solvent which is at least partially water-miscible, or in an aliphatic carboxylic acid of 1 to 4 carbon atoms, and subsequently distilling off any organic solvent which may be present except for said aliphatic carboxylic acid of 1–4 carbon atoms, and the water, if present, remains.

2. A process for the preparation of a powdered azo pigment with improved rheological properties for use in a paint system on an alkyd/melamine, acrylic/melamine, acrylate/isocyanate or polyester/isocyanate basis both of a conventional nature and of a modern nature of the "high solids" type, which comprises coating the surface of the base azo pigment with 1 to 20% by weight of an active substance consisting of a paint additive of the polyurethane series said paint additive prepared by reacting polyisocyanurates which carry free isocyanate groups and said groups being provided by toluylene diisocyanate, hexamethylene diisocyanate or mixtures thereof, with each of the following reactants (1) aliphatic mono- or polyhydroxy- carboxylic acid $C_1$–$C_{20}$-alkyl esters (degree of polycondensation 2–50), (2) polyethylene glycols having average molecular weight of 500–1500 and (3) 5- or 6-membered, saturated or unsaturated heterocyclic compounds which contain at least one nitrogen atom in the ring and contain reactive amino or hydroxy-$C_1$–$C_6$-alkyl groups, in such a quantity that the reactants react with said free isocyanate groups, until isocyanate groups are no longer detectable, the azo pigment is coated by mixing in the form of a dispersion of the base azo pigment in water or in an organic solvent or in a mixture of water and an organic solvent, while stirring, with a solution of the said active substance in an organic solvent which is insoluble or not infinitely soluble in water, or in an organic solvent which is at least partially water-miscible, or in an aliphatic carboxylic acid of 1-4 carbon atoms and subsequently distilling off any organic solvent being present except for the said aliphatic carboxylic acid of 1-4 carbonatoms and the water if present remains.

3. A powdered azo pigment as claimed in claim 1 wherein the said active substance has a weekly basic character and had been employed in a dilute aqueous or non-diluted carboxylic acid of 1 to 4 carbon atoms.

4. In a process as claimed in claim 2 wherein the active substance has a weekly basic character and had been employed in the dilute aqueous or non-diluted aliphatic carboxylic acid of 1-4 carbon atoms including, the steps of neutralizing the said aliphatic carboxylic acid before the distilling off of the organic solvent.

5. The process as claimed in claim 2, wherein the active substance of a paint additive of the polyurethane series is employed in solution of an aliphatic alcohol of 1 to 3 carbon atoms, a glycol, a glycol ether, a glycol ester, a ketone of the formula

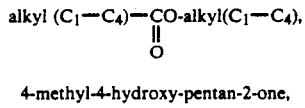

4-methyl-4-hydroxy-pentan-2-one, an aliphatic carboxylic acid of 1 to 4 carbon atoms, an aliphatic carboxylic acid amide of 1 to 4 carbon atoms or of a cyclic carboxylic acid amide as solvents being at least partially water-miscible.

6. The process as claimed in claim 2, wherein the active substance of a paint additive of the polyurethane series is employed in solution of ethanol, propanol, ethylene glycol, diethylene glycol, propylene glycol, glycol mono($C_1$-$C_6$)-alkyl ethers, diglycol mono($C_1$-$C_4$)-alkyl ethers, diglycol dimethylethers, ethylglycol acetate, methylglycol acetate, butyldiglycol acetate, acetone, methylethyl ketone, methyl isobutyl ketone, formic acid, acetic acid, propionic acid, dimethylformamide, or N-methylpyrrolidone as solvents being in at least partially water-miscible.

7. The process as claimed in claim 2, wherein the active substance of a paint additive of the polyurethane series is weakly basic and is employed in solution of an aromatic hydrocarbon, an aliphatic alcohol of 4 to 6 carbon atoms, an ester of an aromatic carboxylic acid or in an aliphatic aromatic ether as solvents being insoluble or not infinitely soluble in water.

8. The process as claimed in claim 2, wherein the active substance is weakly basic and is employed in an aliphatic carboxylic acid of 1 to 4 carbon atoms as the solvent.

9. The process as claimed in claim 2, wherein the weakly basic active substance of a paint additive of the polyurethane series is employed in dilute aqueous acetic acid solutions.

10. The process as claimed in claim 2, wherein the base azo pigment is employed in dispersion of the mixture of water and solvent is used wherein the solvent is an aromatic hydrocarbon, an aliphatic alcohol of 4 to 6 carbon atoms, an ester or an aromatic carboxylic acid, or in an aliphatic aromatic ether, and the active substance of a point additive of the polyurethane series is weakly basic and is employed in an aliphatic carboxylic acid of 1 to 4 carbon atoms as the solvent.

11. The process as claimed in claim 2, wherein the base azo pigment is employed in a dispersion of a mixture of water and monochlorobenzene, and the active substance of a paint additive of the polyurethane series, said substance having a weakly basic character, is employed in a weakly acetic acid solution.

12. The process as claimed in claim 2, wherein the base azo pigment is employed in an aqueous dispersion and the active substance of a paint additive of the polyurethane series is employed in solution of isobutanol.

* * * * *